(12) United States Patent
Kumar et al.

(10) Patent No.: US 12,093,246 B2
(45) Date of Patent: Sep. 17, 2024

(54) METHOD AND SYSTEM FOR IMPROVED CONSENSUS USING BOOTSTRAP RESAMPLING

(71) Applicant: MASTERCARD INTERNATIONAL INCORPORATED, Purchase, NY (US)

(72) Inventors: Shubham Kumar, Haryana (IN); Chandan Garg, Haryana (IN); Puneet Vashisht, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 666 days.

(21) Appl. No.: 16/884,579

(22) Filed: May 27, 2020

(65) Prior Publication Data
US 2021/0374125 A1    Dec. 2, 2021

(51) Int. Cl.
*G06F 16/23* (2019.01)
*G06F 16/36* (2019.01)
*H04L 9/40* (2022.01)

(52) U.S. Cl.
CPC ........ *G06F 16/2379* (2019.01); *G06F 16/367* (2019.01); *H04L 63/12* (2013.01); *H04L 63/1441* (2013.01)

(58) Field of Classification Search
CPC ............ G06F 16/2255; G06F 16/2365; G06F 16/2379; H04L 63/1441
See application file for complete search history.

(56) References Cited

U.S. PATENT DOCUMENTS

| | | | |
|---|---|---|---|
| 10,939,405 B1 * | 3/2021 | Haleem | ................ H04L 9/3239 |
| 2019/0386817 A1 * | 12/2019 | Carson | ................ H04L 9/0643 |
| 2020/0162264 A1 * | 5/2020 | Zamani | ............... H04L 41/0893 |

\* cited by examiner

*Primary Examiner* — Marcin R Filipczyk
(74) *Attorney, Agent, or Firm* — Panitch Schwarze Belisario & Nadel LLP

(57) ABSTRACT

A method for improving consensus in a blockchain network through sampling includes: executing, by a processor of a blockchain node in a blockchain network that manages a blockchain, a script to identify a first sample comprised of a subset of nodes of a plurality of nodes in the blockchain network, wherein nodes included in the subset of nodes are randomly selected; performing, by the subset of nodes comprising the first sample, a first consensus operation among all nodes in the subset of nodes to identify a sample consensus block for the blockchain, where each node in the subset of nodes receives the sample consensus block; and repeating, in the blockchain network, executing the script and performing the first consensus operation for a plurality of additional samples, wherein nodes included in the subset of nodes for each additional sample are randomly selected.

16 Claims, 5 Drawing Sheets

METHOD AND SYSTEM FOR IMPROVED CONSENSUS USING BOOTSTRAP RESAMPLING

FIELD

The present disclosure relates to improving consensus in a blockchain network through bootstrap resampling, specifically the performance of consensus operations in multiple rounds of random samples of nodes in a blockchain network for improved percentage of consensus across nodes.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also provides anonymity as to the individuals or entities involved in a transaction. New blocks are added to the blockchain through a process known as "consensus." In a traditional consensus process, blockchain nodes work to generate a new block that satisfies all requirements, a process known as "mining," and then will share the new block with other nodes. The other nodes will confirm that the block is suitable and then distribute the block throughout the blockchain, which effectively adds that block into the blockchain and moves the nodes on to working on consensus on the next block.

However, there are instances where two blockchain nodes may independently come up with the new block. If the new block is the same (e.g., both nodes independently generated the same solution), then there are no conflicts and the consensus may occur across the blockchain even faster. If the new blocks are different (e.g., include different transactions, different nonces, different timestamps, etc.), then consensus may proceed separately for each block. The result is that the blockchain may become "forked," where some nodes will proceed with a different block than other nodes. In such cases, the main blockchain is the blockchain where a majority of nodes reached consensus with a new block, where a fork is any separate version of the blockchain where consensus was reached with a different block.

In most instances, a fork of a blockchain will eventually stop as the number of nodes decreases and new transactions are unable to be added as they may reference transactions not found in the fork. In such cases, the nodes that follow a fork may synchronize back with the main chain, discarding the blocks added in the fork after leaving the main chain and adding in any blocks added to the main chain during that same time. However, as a fork is created, the number of nodes following the main blockchain decreases. Following the creation of a fork, new forks may be created, further limiting the number of blockchain nodes following the main chain. This may continue before any nodes rejoin the main chain, which can drastically reduce the number of blockchain nodes in the main blockchain, which can leave the blockchain susceptible to 51% attacks. Thus, there is a need for a solution to improve consensus in a blockchain.

SUMMARY

The present disclosure provides a description of systems and methods for improving consensus in a blockchain network through sampling. In the blockchain network, a random sample of blockchain nodes is selected through operation of the chain itself. A consensus operation is performed by the sample of blockchain nodes to reach a consensus on a new block to be added to the blockchain. The process is repeated for a plurality of additional samples (e.g., a number equal to a number of nodes in the blockchain network). When a consensus is reached within a sample, the new block is distributed to each node in the sample, such that no fork is created by any node in the sample. Through the performance of multiple samples, nodes that may have otherwise confirmed a different block have a very high likelihood of being in a sample that reaches consensus on the new block, and will thus not follow a fork of the blockchain. The result is that there is a higher rate of consensus followed by blockchain nodes even in cases where several nodes may have otherwise followed a different fork of the blockchain, which results in higher retention and helps maintain a large number of blockchain nodes following the main blockchain in the blockchain network.

A method for improving consensus in a blockchain network through sampling includes: executing, by a processor of a blockchain node in a blockchain network that manages a blockchain, a script to identify a first sample comprised of a subset of nodes of a plurality of nodes in the blockchain network, wherein nodes included in the subset of nodes are randomly selected; performing, by the subset of nodes comprising the first sample, a first consensus operation among all nodes in the subset of nodes to identify a sample consensus block for the blockchain, where each node in the subset of nodes receives the sample consensus block; and repeating, in the blockchain network, executing the script and performing the first consensus operation for a plurality of additional samples, wherein nodes included in the subset of nodes for each additional sample are randomly selected.

A system for improving consensus in a blockchain network through sampling includes: a blockchain network that manages a blockchain; a plurality of nodes in the blockchain network; and a blockchain node included in the plurality of nodes, wherein a processor of the blockchain node executes a script to identify a first sample comprised of a subset of nodes of a plurality of nodes in the blockchain network, wherein nodes included in the subset of nodes are randomly selected, the subset of nodes comprising the first sample performs a first consensus operation among all nodes in the subset of nodes to identify a sample consensus block for the blockchain, where each node in the subset of nodes receives the sample consensus block, and executing the script and performing the first consensus operation are repeated for a plurality of additional samples, wherein nodes included in the subset of nodes for each additional sample are randomly selected.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Improved Consensus in a Blockchain Network

Figure 1:
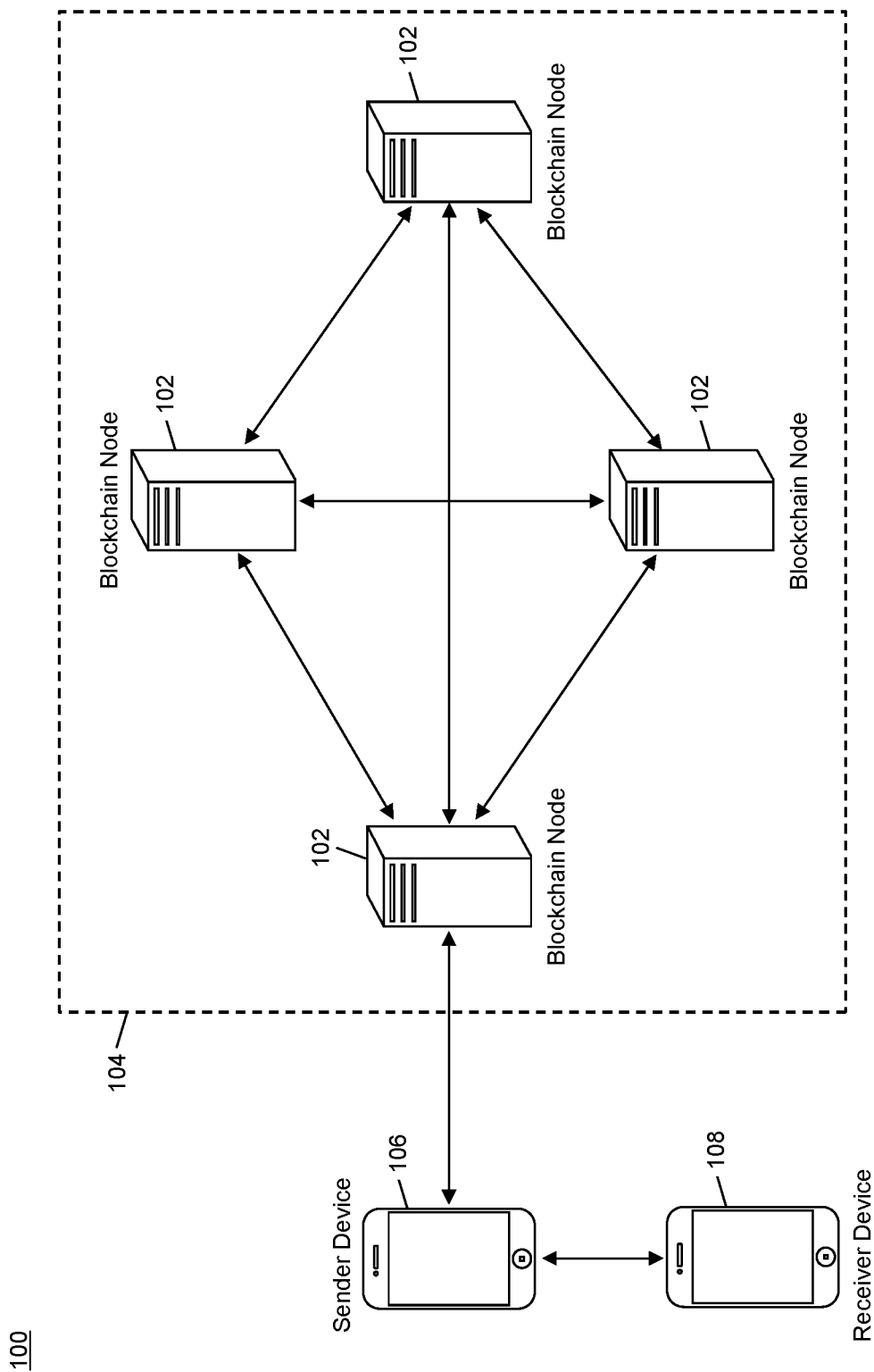
FIG. 1 is a block diagram illustrating a high level system architecture for improving consensus in a blockchain network through sampling in accordance with exemplary embodiments.

FIG. 1 illustrates a system 100 for improving consensus in a blockchain network through the use of bootstrap resampling.

Figure 2:
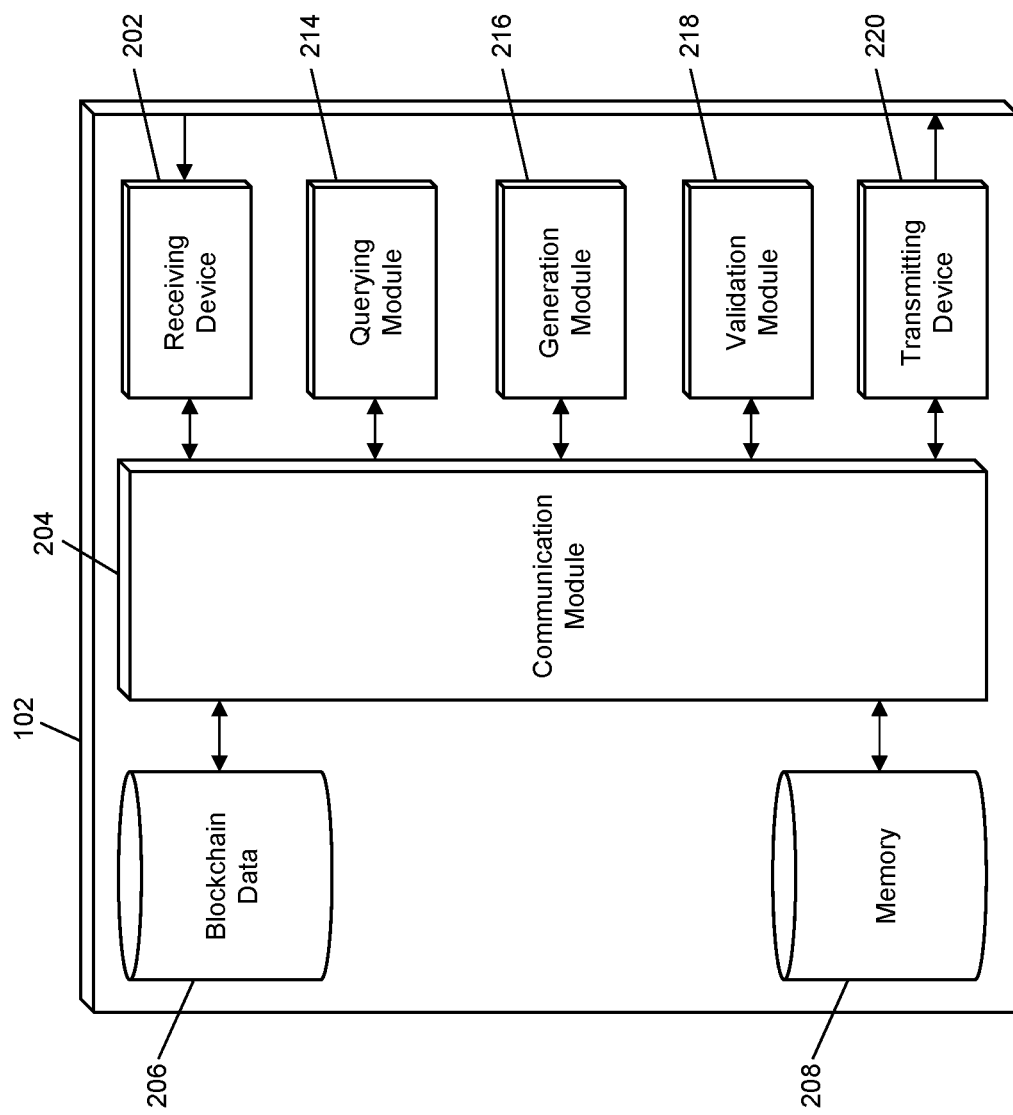
FIG. 2 is a block diagram illustrating a blockchain node of the system of FIG. 1 for improving consensus through sampling in a blockchain network in accordance with exemplary embodiments.
Figure 5:
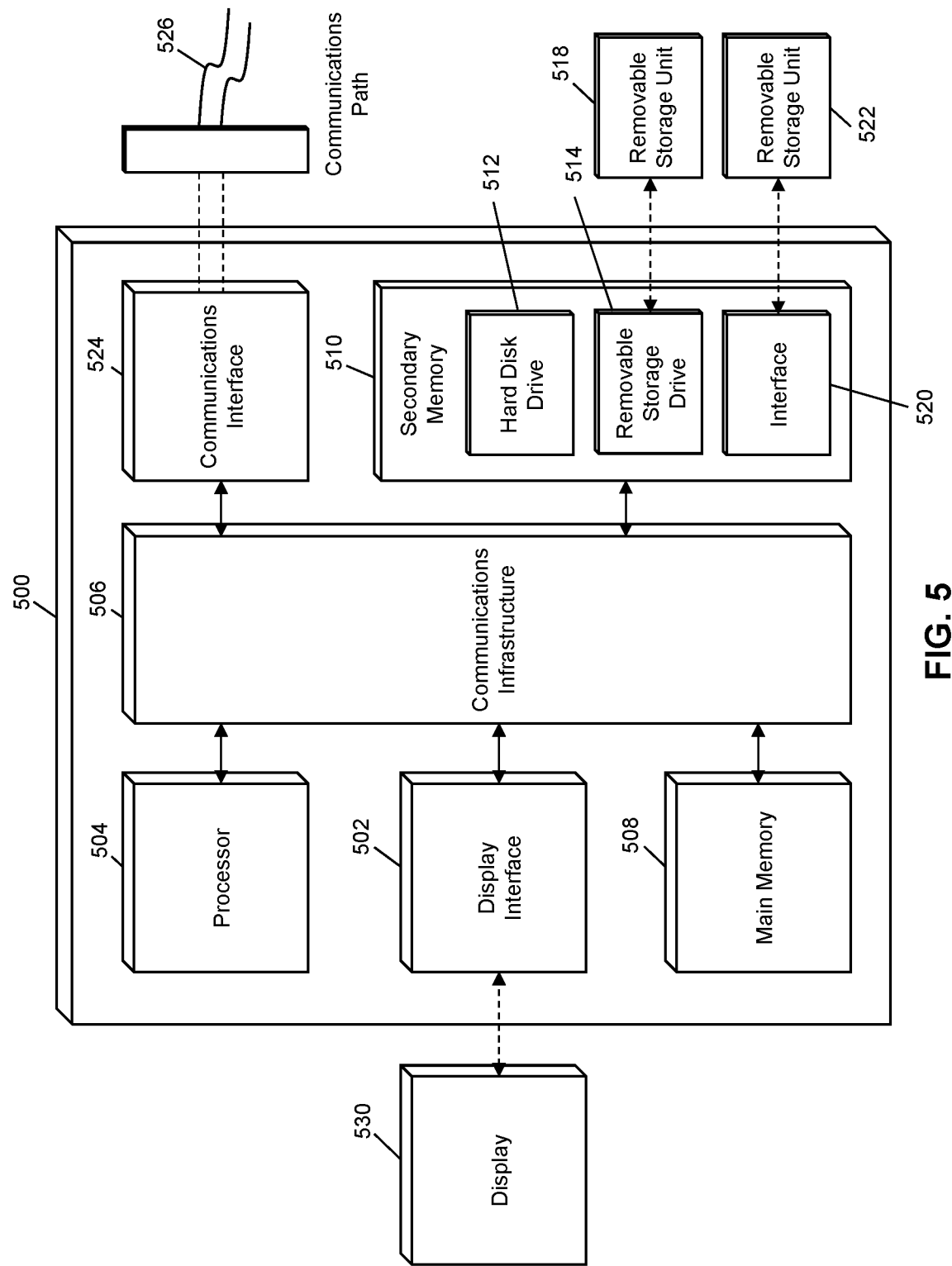
FIG. 5 is a block diagram illustrating a computer system architecture in accordance with exemplary embodiments.

The system 100 may include a blockchain network 104. The blockchain network 104 may be comprised of a plurality of blockchain nodes 102. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In a traditional blockchain, each blockchain node 102 may attempt to generate a new block that can be confirmed for the blockchain. A block may have to satisfy one or more requirements depending on the configuration of the blockchain itself. For instance, the block reference value must be accurate and validated by independent generation thereof by another blockchain node 102 and the data reference value must also be accurate and independently verifiable by another blockchain node 102. In some blockchains, a new block must include a nonce in the block header thereof where, when the new block or the new block header is hashed, the resulting hash value satisfies predetermined criteria, such as a value having a predetermined number of leading zeroes. In such cases, blockchain nodes 102 may randomly select nonces and generate hash values until a suitable value is found, after which they may use the nonce and generate the new block and submit the new block to other blockchain nodes 102.

A blockchain node 102 may continue to attempt to generate a suitable new block until a new block is generated or until a new block is received from another blockchain node 102 in the blockchain network 104. In latter instances, the blockchain node 102 may confirm that the new block, Block$_1$, is suitable (e.g., it follows all applicable rules) and, if so, distribute the new block to other blockchain nodes 102 connected thereto in the blockchain network 104. Through such a process, as soon as a new block can be generated by a blockchain node 102, the new block is distributed throughout the blockchain network 104. However, in some cases, a different blockchain node 102 may independently generate a new block, Block$_2$, that is different from Block$_1$. For instance, the other blockchain node 102 may identify a different nonce that still results in a hash value having a suitable number of leading zeroes. In such cases, the blocks may be confirmed and distributed throughout the blockchain network 104. Whichever block is distributed to a majority of blockchain nodes 102 in the blockchain network 104 dictates the main blockchain, where a blockchain for blockchain nodes 102 that confirmed the other block becomes a fork from the main blockchain.

In the system 100, the blockchain network 104 may be configured to perform bootstrap resampling as a means of consensus. In a bootstrap resampling process, the blockchain network 104 may identify a sample of blockchain nodes 102. The sample may be randomly selected in that the blockchain nodes 102 that are included in the sample may be randomly selected from all blockchain nodes 102 in the blockchain network 104. In some cases, a single blockchain node 102 may be selected more than once to be included in a sample, such as where each selection may be a truly random selection from the entire set of blockchain nodes 102 in the blockchain network 104.

In the blockchain network 104, a sample of blockchain nodes 102 may be configured to perform a consensus operation among the blockchain nodes 102 in the sample. In a sample, the consensus that is reached in the sample may be shared among all of the blockchain nodes 102 in the sample. In other words, the new block that is identified in the consensus operation may be distributed to every blockchain node 102 in the sample, such that no blockchain node 102 in a sample may follow a fork of the blockchain. This may result in higher retention of blockchain nodes 102 in the main blockchain and reduce forking, thereby having a blockchain of greater strength that is less susceptible to 51% attacks or other forms of fraud.

The sampling process may be repeated a plurality of times, where each time a new sample is randomly selected and the consensus operation performed. In some embodiments, the number of times the sample process is performed may be equal to the number of blockchain nodes 102 in the blockchain network 104 or otherwise based thereon. For example, if there are 100 nodes in the blockchain network 104, then 100 samples may be identified, where each of the 100 samples may perform the sample consensus operation. In another example, if there are 100 nodes in the blockchain network 104, then 50 samples may be identified. The number of blockchain nodes 102 in a sample may vary. In some cases, the number of blockchain nodes 102 in a sample may match the number of blockchain nodes 102 in the blockchain network 104 or be otherwise based on the number of blockchain nodes 102. For instance, in one example, the number of nodes in a sample may be 25% or 50% of the total number of blockchain nodes 102 in the blockchain network 104.

In some embodiments, the blockchain itself may be configured with an executable script or other data that can be used by a blockchain node 102 to independently identify the samples. For example, a configuration file or operating rules that each blockchain node 102 has and follows to operate as a blockchain node 102 may include a script or other rules that are used to identify the samples. For instance, the script may order every blockchain node 102 in the blockchain network 104 by device identifier and then identify a sample using a random number generator that operates using a time-based salt such that each blockchain node 102 that executes the script will identify the same random sample. In some instances, the blockchain itself may include a smart contract that may self-execute to identify the samples, such as using the same process discussed above. The operation may enable each blockchain node 102 to independently identify the samples. Such an operation prevents any centralized system from being able to sample the blockchain nodes 102 in any particular manner, preventing potential attacks and fraud, and maintains the ability of the blockchain to be decentralized and lack oversight by any specific entity or system.

The blockchain nodes 102 in the blockchain network 104 may attempt to generate a suitable new block in the same manner as in a traditional blockchain. Once a blockchain node 102 generates a new block that is suitable, it may distribute the new block to only blockchain nodes 102 in its sample. A first consensus operation may be performed among the blockchain nodes 102 in that particular sample. In cases where the blockchain node 102 comes up with the solution prior to any other blockchain node 102 in the sample, the entire sample may reach consensus on the same block. If multiple blockchain nodes 102 independently generate different solutions, then consensus may be reached using the same process as in a traditional blockchain. However, unlike in a traditional blockchain, when a majority of blockchain nodes 102 in a sample confirm a specific block, that specific block becomes the new block for each blockchain node 102 in the sample. Any blockchain nodes 102 that confirmed a different block will discard the different block and confirm the specific block, resulting in each blockchain node 102 in the sample following the same blockchain.

In some embodiments, a second consensus operation may be performed in the blockchain network 104 to come to a consensus among the blocks identified in each of the samples, such as where a block identified in the majority of the samples may be selected as the new block to add to the blockchain. The new block may then be added to the blockchain accordingly. In some cases, a different sample may independent generate a different and come to a consensus on a different new block, $Block_B$. In such cases, the different sample may submit the new block in the second consensus operation, where the block that is confirmed in a majority of the samples will be added to what becomes the main blockchain.

In some embodiments, each blockchain node 102 may identify a new block for addition to the blockchain prior to the sampling process. In such embodiments, blockchain nodes 102 may attempt to identify a new block and may share the block among other nodes, similar to the consensus performed in a traditional blockchain. However, once each blockchain node 102 has confirmed a block, the sampling process may occur. In such an embodiment, the first consensus operation in the sampling process may include each of the blockchain nodes 102 in the sample performing a consensus using their confirmed block, or may otherwise be a polling of the blockchain nodes 102 in the sample, where any blockchain node 102 in a sample that did not already confirm the consensus block for the sample may adopt the consensus block. In some cases, the sampling operations may performed simultaneous. In other cases, the sampling operations may be performed one at a time, such that if a blockchain node 102 follows a different block after consensus in a first sample, the blockchain node 102 may already follow that block in the consensus operation in a next sample.

The use of blockchain groups where each blockchain node 102 therein follows consensus of the sample may improve the strength of a consensus in the blockchain network 104, thus reducing forking and the blockchain nodes 102 that follow a fork off of a blockchain. For instance, FIG. 3, discussed below, illustrates a sampling process in a blockchain network 104 that includes ten blockchain nodes 102, where three of the ten blockchain nodes 102 are inclined to confirm a second $Block_2$ compared to a first $Block_1$ that would be confirmed by the other seven nodes in a traditional consensus process. Through the performing of five samples of five blockchain nodes 102 that are randomly selected, the consensus improves to nine of the ten blockchain nodes 102, increasing the consensus from 70% to 90%.

The methods and systems discussed herein provide for decentralized grouping of blockchain nodes 102 in a blockchain network 104 into samples and the performing of consensus among multiple samples. A traditional consensus process is separated into a repeated sampling of blockchain nodes 102 that are randomly selected. The result is often a stronger consensus, which leads to higher retention of blockchain nodes 102 in a main chain, further strengthening the blockchain network 104 against attacks.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102 and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with new transactions for confirmation, confirmed blockchain transactions, new blocks for confirmation, confirmed blocks for addition to the blockchain, messages regarding block confirmations, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 208. The memory 208 may be configured to store data for use by the blockchain node 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, etc.

The blockchain node 102 may also include blockchain data 206, which may be stored in the memory 208 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 102, sample identification rules, sample identification algorithms, blockchain sample data, sample consensus rules, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 208 of the blockchain node 102 to identify information stored therein. The querying module 214 may then output the identified information to an appropriate engine or module of the blockchain node 102 as necessary. The querying module 214 may, for example, execute a query on the blockchain data 206 to identify a prior block in the blockchain or pending transactions for use in generating a new block.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain. The generation module 216 may also be configured to identify samples using a self-executing smart contract in the blockchain or an executable script in the configuration of the blockchain itself.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device is authorized to use the transaction outputs included in a new transaction submission and that the transaction outputs have not been previously used to transfer currency in another transaction. The validation module 218 may also be configured to validate digital signatures using public keys and suitable signature generation algorithms. The validation module 218 may be further configured to confirm new blocks, such as by validating block reference values and data reference values included therein.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102 and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 102 that are superimposed or otherwise encoded with new blockchain data values, new blocks for confirmation, confirmed blocks, messages regarding block or transaction confirmations, and other data used in the operation and management of the blockchain.

Blockchain Consensus Using Bootstrap Resampling

Figure 3:
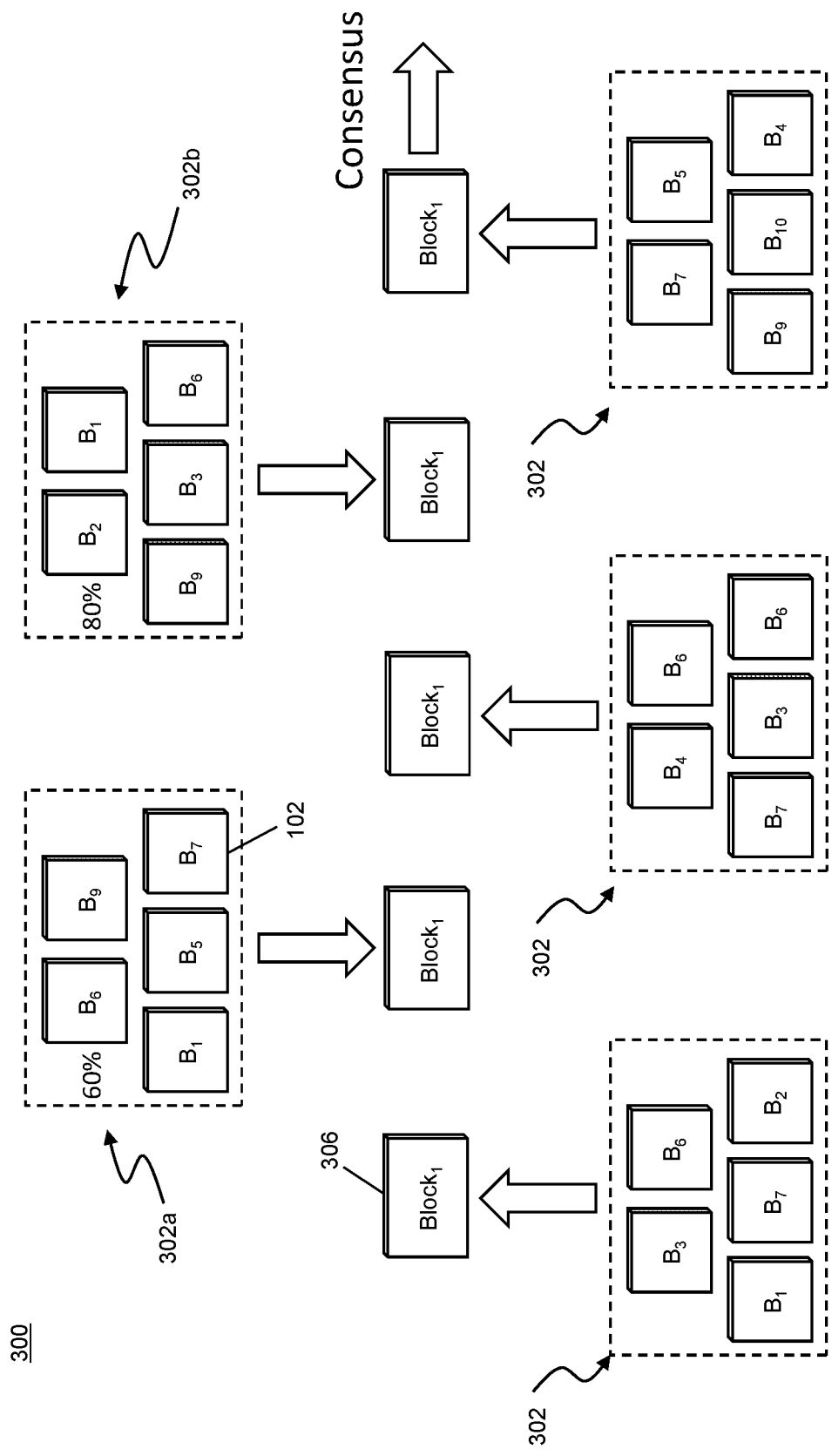
FIG. 3 is a diagram illustrating an example consensus process in the system of FIG. 1 through the use of sampling in accordance with exemplary embodiments.

FIG. 3 illustrates a consensus process 300 performed in the blockchain network 104 in the system 100 of FIG. 1, using bootstrap resampling to achieve a higher consensus than in traditional blockchain networks 104. The process 300 is an example for a blockchain network 104 that includes ten nodes, where five samples are performed with five blockchain nodes 102 in each sample. It will be apparent to persons having skill in the relevant art that the example illustrated in FIG. 3 is illustrative, and that other sizes of samples and numbers of samples may be suitable for performing the functions discussed herein.

In the process 300, the blockchain network 104 may include, e.g., ten blockchain nodes 102, indicated by numbers 1 through 10 as blockchain nodes $B_1$ through $B_{10}$. The blockchain nodes 102 may be configured to identify a new block for consensus where, in a traditional consensus process, blockchain nodes $B_1$, $B_2$, $B_4$, $B_5$, $B_6$, $B_7$, and $B_{10}$ would confirm a new block $Block_1$, while blockchain nodes $B_3$, $B_8$, and $B_9$ would confirm a new block $Block_2$, representing a consensus rate of 70% (not illustrated).

In the process 300, five samples 302 may be identified, where each sample includes five blockchain nodes 102, for example. Each of the samples 302 may perform a consensus operation to identify a sample consensus block 306. In the illustrated example, each sample 302 includes n, e.g., five blockchain nodes 102 that are randomly selected from the ten blockchain nodes 102 in the blockchain network 104. As discussed above, a true random sampling may be used, such as illustrated in FIG. 3 where the fourth sample includes two copies of blockchain node $B_6$, for example.

Alternatively, if n nodes 102 in the blockchain network 104 have a sample 302a with a consensus of 60% initially using blockchain nodes $B_1$, $B_5$, $B_7$, $B_6$ and $B_9$, the blockchain network 104 through scripting in the software of instance will bootstrap the n samples with replacements where every sample 302 will have n nodes (which can be thought of as data points), that is, randomly selected nodes 102 will replace the nodes 102 in the initial sample 302 and form a new sample 302. For example, in sample 302b, blockchain nodes $B_5$ and $B_7$ have been replaced with $B_2$ and $B_3$. This might result is a consensus in that sample 302b of 80%, as an example. There will be a number of different samples 302 and the blockchain network 104 through the blockchain script receive a vote from each of the samples 302. Because the original sample 302 had 60% good nodes 102, for every node 102 we choose for every new sample 302, there is 60% probability of choosing a good miner node 102. So, it is somewhat more likely (60%) that every miner in every sample is a good node 102 compared to the lesser likely (40%) to be bad nodes 102, i.e., nodes 102 not getting to consensus. Consensus is thus based on how many samples 302 got a consensus, which results in a consensus greater than the initial consensus (e.g., 60% in this example) or at least equal in a worse case. In below example (based on actual simulation), the final average consensus turns out to be 78.3%. Because of probability of choosing a good miner node 102 is more than 51%, most of the samples 302 will perform better than a traditional method and overall average will be greater or at least equal to a traditional method, thus representing an advantage in reduction of consumption of computing power and energy.

In the illustrated example, each of the samples 302 includes a majority of blockchain nodes 102 that reached a consensus for $Block_1$, resulting in the consensus for all five samples being $Block_1$. The result is that the blockchain network 104 will add $Block_1$ to the blockchain. In the process 300 illustrated at the bottom of FIG. 3, each of the blockchain nodes 102 in the blockchain network 104 was included in one of the three samples except for blockchain node $B_8$. The result is that, because each blockchain node 102 follows the consensus of its sample, every blockchain node 102 in the blockchain network 104 except for blockchain node $B_8$ will add $Block_1$ to the blockchain as its next block. Thus, the blockchain network 104 retains nine of the ten blockchain nodes 102 on the main block, with only blockchain node $B_8$ following a fork that added $Block_2$ (not illustrated) to the blockchain. As a result, the sampling process improved the consensus rate of the blockchain network 104 from 70% using traditional methods to 90% with just five samples of five blockchain nodes 102 each.

Exemplary Method for Improving Blockchain Consensus

Figure 4:
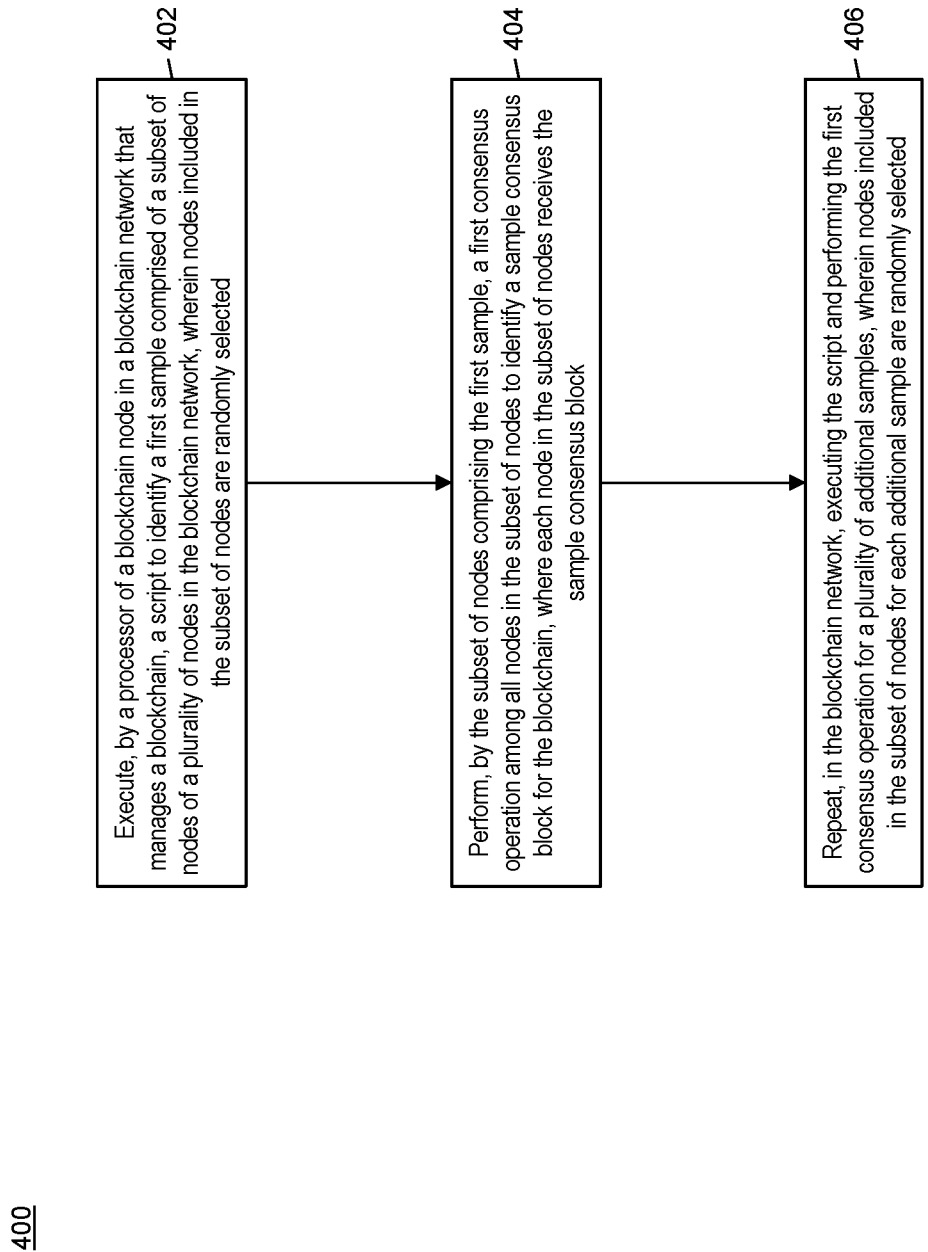
FIG. 4 is a flow chart illustrating an exemplary method for improving consensus in a blockchain network through sampling in accordance with exemplary embodiments.

FIG. 4 illustrates a method 400 for improving consensus in a blockchain network through the use of a bootstrap resampling process with randomized selection of blockchain nodes in samples.

In step 402, a script may be executed by a processor of a blockchain node (e.g., blockchain node 102) in a blockchain network (e.g., blockchain network 104) that manages a blockchain to identify a first sample (e.g., sample 302) comprised of a subset of nodes of a plurality of nodes in the blockchain network, wherein nodes included in the subset of nodes are randomly selected. In step 404, the subset of nodes comprising the first sample may perform a first consensus operation among all nodes in the subset of nodes to identify a sample consensus block for the blockchain, where each node in the subset of nodes receives the sample consensus block. In step 406, the blockchain network may repeat executing the script and performing the first consensus operation for a plurality of additional samples, wherein nodes included in the subset of nodes for each additional sample are randomly selected.

In one embodiment, the method 400 may further include performing, by the blockchain network, a second consensus operation to identify an overall new block for the blockchain based on the sample consensus block identified in the first consensus operation for the first sample and the plurality of additional samples. In a further embodiment, the method 400 may also include distributing, in the blockchain network, the overall new block to each node in the subset of nodes included in each sample of the plurality of additional samples. In some embodiments, a number of samples including the first sample and the plurality of additional samples may be equal to a number of nodes in the plurality of nodes in the blockchain network. In one embodiment, a number of nodes in the subset of nodes may be less than a number of the plurality of additional samples.

In some embodiments, the sample consensus block identified for each sample in the plurality of additional samples may be computationally equivalent. In one embodiment, a number of nodes in the subset of nodes for each sample of the plurality of additional samples may be equal. In some embodiments, the script may be stored in one of: the blockchain and a configuration file stored in each node in the plurality of nodes.

Computer System Architecture

FIG. 5 illustrates a computer system 500 in which embodiments of the present disclosure, or portions thereof, may be implemented as computer-readable code. For example, the blockchain nodes 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the process of FIG. 3 and the method of FIG. 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the process of FIG. 3 and the method illustrated by FIG. 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for improving consensus in a blockchain network through sampling. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for improving consensus in a blockchain network through sampling, comprising:
receiving, by a processor of a blockchain node in a blockchain network that manages a blockchain, a new block for addition to the blockchain;
executing, by the processor of the blockchain node, a script to identify a first sample comprised of a subset of nodes of a plurality of nodes in the blockchain network for consensus of the new block, wherein nodes included in the subset of nodes are randomly selected;
performing, by the subset of nodes comprising the first sample, a first consensus operation among all nodes in the subset of nodes to identify a sample consensus block for the blockchain, where each node in the subset of nodes receives the sample consensus block; and
repeating, in the blockchain network, executing the script and performing the first consensus operation for a plurality of additional samples, wherein nodes included in the subset of nodes for each additional sample are randomly selected.

2. The method of claim 1, further comprising:
performing, by the blockchain network, a second consensus operation to identify an overall new block for the blockchain based on the sample consensus block identified in the first consensus operation for the first sample and the plurality of additional samples; and
adding, by the blockchain network, the overall new block to the blockchain.

3. The method of claim 2, further comprising:
distributing, in the blockchain network, the overall new block to each node in the subset of nodes included in each sample of the plurality of additional samples.

4. The method of claim 1, wherein a number of samples including the first sample and the plurality of additional samples is equal to a number of nodes in the plurality of nodes in the blockchain network.

5. The method of claim 1, wherein a number of nodes in the subset of nodes is less than a number of the plurality of additional samples.

6. The method of claim 1, where the sample consensus block identified for each sample in the plurality of additional samples is computationally equivalent.

7. The method of claim 1, wherein a number of nodes in the subset of nodes for each sample of the plurality of additional samples is equal.

8. The method of claim 1, wherein the script is stored in one of: the blockchain and a configuration file stored in each node in the plurality of nodes.

9. A system for improving consensus in a blockchain network through sampling, comprising:
a blockchain network that manages a blockchain, the blockchain network including a plurality of blockchain nodes, wherein each of the plurality of blockchain nodes includes a memory storing a copy of the blockchain;
a processor of a first blockchain node of the plurality of blockchain nodes configured to receive a new block for addition to the blockchain;
a processor of a first blockchain node of the plurality of blockchain nodes configured to execute-a script to identify a first sample comprised of a subset of second blockchain nodes of the plurality of blockchain nodes in the blockchain network for consensus of the new block, wherein the subset of second blockchain nodes are randomly selected;
a processor for each of the subset of second blockchain nodes configured to perform a first consensus operation among the subset of second blockchain nodes;
the processor for each of the subset of second blockchain nodes configured to identify a sample consensus block for the blockchain based on the first consensus operation, where each second blockchain node in the subset of second blockchain nodes receives the sample consensus block, and
executing the script and performing the first consensus operation are repeated for a plurality of additional samples, by the processor for each of the subset of blockchain nodes, wherein blockchain nodes included in the subset of blockchain nodes for each additional sample are randomly selected.

10. The system of claim 9, wherein a second consensus operation is performed in the blockchain network to identify an overall new block for the blockchain based on the sample consensus block identified in the first consensus operation for the first sample and the plurality of additional samples; and
wherein the overall new block is added to the blockchain.

11. The system of claim 10, wherein the blockchain network distributes the overall new block to each node in the subset of nodes included in each sample of the plurality of additional samples.

12. The system of claim 9, wherein a number of samples including the first sample and the plurality of additional samples is equal to a number of nodes in the plurality of nodes in the blockchain network.

13. The system of claim 9, wherein a number of nodes in the subset of nodes is less than a number of the plurality of additional samples.

14. The system of claim 9, where the sample consensus block identified for each sample in the plurality of additional samples is computationally equivalent.

15. The system of claim 9, wherein a number of nodes in the subset of nodes for each sample of the plurality of additional samples is equal.

16. The system of claim 9, wherein the script is stored in one of: the blockchain and a configuration file stored in each node in the plurality of nodes.

* * * * *